Patented Sept. 18, 1951

2,568,117

UNITED STATES PATENT OFFICE 2,568,117

PROCESSES FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application February 13, 1950, Serial No. 144,031

4 Claims. (Cl. 252—342)

This invention relates to processes or procedures particularly adapted for preventing, breaking or resolving emulsions of the water-in-oil type, and particularly petroleum emulsions.

Complementary to the above aspect of our invention is our companion invention concerned with the new chemical products or compounds used as the demulsifying agents in said aforementioned processes or procedures, as well as the application of such chemical compounds, products and the like in various other arts and industries, along with the method for manufacturing said new chemical products or compounds which are of outstanding value in demulsification. See our co-pending application Serial No. 144,032, filed February 13, 1950.

As to the feature of our present invention which is concerned with the resin per se, as distinguished from the oxyalkylation products, reference is made to our co-pending application Serial No. 144,033, filed February 13, 1950.

Our invention provides an economical and rapid process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

It also provides an economical and rapid process for separating emulsions which have been prepared under controlled conditions from mineral oil, such as crude oil and relatively soft waters or weak brines. Controlled emulsification and subsequent demulsification, under the conditions just mentioned, are of significant value in removing impurities, particularly inorganic salts, from pipeline oil.

Demulsification, as contemplated in the present application, includes the preventive step of commingling the demulsifier with the aqueous component which would or might subsequently become either phase of the emulsion in the absence of such precautionary measure. Similarly, such demulsifier may be mixed with the hydrocarbon component. Reference is made to our co-pending applications Serial Nos. 8,722 and 8,723, both filed February 16, 1948, now Patents 2,499,365 and 2,499,366, granted March 7, 1950.

Briefly stated, the present invention in one of its more important aspects is concerned with the resolution of water-in-oil emulsions by means of certain oxyalkylated resins hereinafter described.

More specifically, the present invention is concerned with a process for breaking petroleum emulsions of the water-in-oil type, characterized by subjecting the emulsion to the action of a demulsifier including hydrophile synthetic products; said hydrophile synthetic products being oxyalkylation products of:

(A) An alpha-beta alkylene oxide having not more than 4 carbon atoms and selected from the class consisting of ethylene oxide, propylene oxide, glycide and methylglycide; and (B) An oxyalkylation-susceptible, fusible, organic solvent-soluble, water-insoluble, phenolisanic acid-formaldehyde resin; said resin being derived by a reaction involving approximately 2 moles of a difunctional phenol, one mole of isanic acid, and one-fourth to one-half mole of formaldehyde; said resin being formed in the substantial absence of trifunctional phenols; said phenol being of the formula:

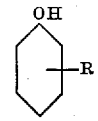

in which R is a hydrocarbon radical having at least 4 and not more than 14 carbon atoms and substituted in the 2,4,6 position; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Reference is made to our two copending applications Serial Nos. 59,768 (now Patent No. 2,560,333, dated July 10, 1951) and 59,767, both filed November 12, 1948. The first of the aforementioned co-pending applications is concerned with a process for breaking petroleum emulsions of the water-in-oil type, characterized by subjecting the emulsion to the action of a demulsifier including hydrophile synthetic products; said hydrophile synthetic products being oxyalkylation products of:

(A) An alpha-beta alkylene oxide having not more than 4 carbon atoms and selected from the class consisting of ethylene oxide, propylene oxide, butylene oxide, glycide and methylglycide; and (B) An oxyalkylation-susceptible, fusible, organic solvent-soluble, water-insoluble, phenolic resin; said resin being derived at least in part by reaction with an acetylenic hydrocarbon so as to introduce an altered acetylenic radical as the linking structure between phenolic nuclei; said oxyalkylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

The second of the aforementioned co-pending applications is concerned with the oxyalkylated resins referred to immediately preceding as new compounds or compositions of matter and not specifically limited to their use in demulsification.

The present invention is concerned with breaking petroleum emulsions by the oxalkylated derivatives of certain resins which involve in their manufacture a phenol, an acetylenic reactant, and an aldehyde, such as formaldehyde. In light of what will be said hereinafter, however, one cannot necessarily predict as to whether or not the acetylenic reactant necessarily forms a phenolic resin of the same type as acetylene. The acetylenic reactant employed is a fatty acid which contains, among other things, an acetylenic linkage. This fatty acid is derived from a vegetable oil, which, in turn, is derived from an African nut. The nut is known as an Isano nut, or Boleko nut. It also is known by other terms. These nuts, or similar nuts, which are conveniently included in the same designation, have been shipped into Europe for the last several years or longer, and the oil derived therefrom has been used as drying oil.

The exact nature of the fatty acids which are present, as glycerols in Isano nuts, Boleko nuts, or similar nuts (Ongueko or Ongoké) is not known. Such nut-bearing trees or shrubs occur in the French and Belgian Congo, and apparently belong to what botanists describe as Olimiae, botanically known as Onguekoa Gore Engler or also as Ongokea Klaineana.

For a brief and authoritative examination of the literature in this regard, see Ralston, "Fatty Acids and Their Derivatives," John Wiley & Sons, Inc., New York, 1948. Steger and van Loon (Fette u. Seifen, 44, 243 (1937)), identified the fatty acid as being either 6-octadecen-9-ynoic acid or 9-octadecen-6-ynoic acid. Subsequently, Castille (Ann., 543, 104 (1940)), concluded that a similar acid which he termed erythrogenic acid was represented by either of the following two formulae:

$CH_2:CHC\vdots C(CH_2)_4C\vdots C(CH_2)_7CO_2H$, $CH_2:CH(CH_2)_4C\vdots CC\vdots C(CH_2)_7CO_2H$ Subsequently, Steger and van Loon (Rec. trav. chim., 59, 1156 (1940)), named this acid "isanic" acid.

Since the composition of this material is still a matter for further examination, we are using the term "isanic" acid to mean the fatty acid obtained by the saponification of any of the above indicated fatty ester, with the understanding that such acid contain at least one acetylenic linkage, and in addition to such acetylenic linkage, is probably more highly unsaturated, due to either the presence of one or more additional acetylenic linkages, or one or more double bonds. Others have referred to this same acid apparently as Boleko nut oil fatty acid. We are using the term isanic acid as synonymous with this same terminology.

Attention is directed also to what is said as to the similarity or the equivalency of these three oils in Lewkowitsch, J., "Chemical Technology and Analysis of Oils, Fats and Waxes," volume II, 6th edition, pp. 159–60, MacMillan & Co., Ltd., New York, 1921; see also what is said in regard to isanic acid, idem., volume I, page 214. Presumably, "isamic" acid and "isanic" acid are the same.

See also what is said by Bergmann in "The Chemistry of Acetylene and Related Compounds," p. 103, Interscience Publishers, Inc., New York, 1948.

As previously noted, we have obtained these nuts, which are suggestive of a large filbert, cracked and ground them in the customary manner, expressed as much oil as we could under pressure, and then extracted with xylene by refluxing under a condenser. We subsequently evaporated the xylene, mixing together the oil obtained by expressing and extracting, clarified it by filtering through fuller's earth, and then saponified it with caustic soda. We made a solution of the soap or salt so obtained and then liberated the free fatty acids by use of dilute hydrochloric acid. These acids, which, as previously stated, will be referred to as isanic acid, have been employed in the subsequent preparations.

For convenience, what is said hereinafter will be divided into three parts.

Part 1 will be concerned with the preparation of the resinous compound;

Part 2 will be concerned with the oxyalkylation of the resinous compound, and

Part 3 will be concerned with the use of such oxyalkylated derivative for demulsification, as hereinafter described in detail.

PART 1

Based on actual acid value of the Boleko oil fatty acid obtained by us, we have used a molecular weight for the fatty acid of 288, although it is understood that this value is not intended to represent any different structure than what was said previously. There may have been present some non-saponifiable material.

*Example 1a*

150 grams of Boleko nut oil fatty acid (isanic acid) and 172 grams of para-tertiary amylphenol were reacted in a resin pot. The equipment used was a conventional two-piece laboratory resin pot. The cover part of the equipment had four openings: One for reflux condenser; one for the stirring device; one for a separatory funnel or other means of adding reactants; and a thermometer well. In the manipulation employed, the separatory funnel insert for adding reactants was not used. The device was equipped with a combination reflux and water-trap apparatus, so that the single piece of apparatus could be used as either a reflux condenser or a water trap, depending upon the position of the three-way glass stop-cock. This permitted convenient withdrawal of water from the water trap. The equipment, furthermore, permitted any setting of the valve without disconnecting the equipment. The resin pot was heated with a glass fibre electrical heater constructed to fit snugly around the resin pot. Such heaters, with regulators, are readily available.

To the above mixture of two reactants there was added 15 grams of zinc acetate as a catalyst. The mixture was stirred for 16 hours at 180°–190° C., and then stirred for 8 hours at 210°–215° C. At the end of this time tests for unreacted amylphenol showed there was only a small amount, or mere trace, present. At this point the reaction mass was allowed to cool to approximately 100° C., and then an amount of xylene equal in weight to the reaction mass, approximately 225 grams, was added. When solution was complete, the mixture was removed from the reaction flask and filtered, and then returned to the flask for further reaction with formaldehyde. There were also added 3½ grams of concentrated hydrochloric acid and 1½ grams of monoalkyl ($C_{10}$–$C_{20}$, principally $C_{12}$–$C_{14}$) benzene monosulfonic acid sodium salt. We are not convinced that one need add any more acid catalyst, for the reason that apparently enough zinc acetate or acetic acid stays behind from the previous reaction to act as a catalyst, but since this practice had been uniformly satisfactory in the manufacture of a large variety of resins, it was followed in this instance purely as a precautionary measure.

In the final step, then, the previously formed resin, the catalyst, solvent, etc., were heated to about 80°–85° C., at which point 44 grams of formaldehyde were run in and the temperature raised to approximately 100° C., or slightly higher. The reaction mixture was then permitted to reflux at 100°–105° C., for one-half to two hours. The reflux trap arrangement was then changed from the reflux position to the normal water entrapment position. The uncombined formaldehyde, the water solution and the water of reaction were permitted to distil out and collect in the trap. As the water distilled out, the temperature gradually increased to that determined by the boiling point of xylene, to wit, about 150° C. The water was removed in about 1½ hours. An examination of the aqueous solution obtained in the trap showed that considerable formaldehyde was present, i. e., although only one-half mole or less of formaldehyde had been added for each mole of Boleko oil fatty acids, and each two moles of amylphenol, yet only a fraction of this formaldehyde had been employed for reaction. Examination showed that the amount used in reaction was approximately one-half the amount added, or somewhat greater, i. e., one-fourth mole or thereabouts, the obvious range being from a quarter of a mole up to a half mole. The final product was a resinous material suggestive of a very viscous, resinous liquid, or a tacky solid, dark red or blackish red in color. This applied to the appearance of the solvent-free material.

No effort is made to speculate as to the composition of this resin. Attention is directed again to our two aforementioned co-pending applications Serial Nos. 59,767 and 59,768, both filed November 12, 1948, in which there is a discussion of the chemistry involved in the formation of resins from phenols and acetylene. It is possible that this is the primary reaction involved in the initial stage of resinification. On the other hand, it is well known that phenols will combine under appropriate conditions with unsaturated compounds other than acetylene compounds. It may be that isanic acid contains ethylenic linkages, as well as acetylenic linkages and this combination may take place at this point.

It has been suggested also that at temperatures herein employed, for instance, approximately 215° C., or slightly higher, that one may form esters of phenolic hydroxyls. See U. S. Patent No. 2,485,097, dated October 18, 1949, to Howland and Tewksbury, Jr. Over and above this fact is the fact that at least some formaldehyde (a quarter of a mole or more) enters into the reaction, as previously noted. For this reason, no effort is made to speculate as to the composition, and subsequently, in the claims, the resinous product is described in terms of method of manufacture, for the reason that this appears to be the only adequate method available. It is to be noted that enough formaldehyde is used to exhaust any functional groups present, and susceptible to reaction with formaldehyde under the actual conditions of resinification.

Substantially the same procedure was followed with a number of other difunctional phenols, as shown in the table following. The examples are numbered 2 to 12. These phenols contain 4 to 14 carbon atoms in the substituent hydrocarbon radical. The procedure employed was substantially the same and the conditions substantially the same as in Example 1, preceding. The appearance of the final products was about the same, except that in a general way, the higher the weight of the substituent group, the greater the tendency towards giving a sticky, viscous liquid, rather than a solid material.

The solvent, such as xylene, can be removed from such resin by vacuum distillation at 150° C., or by any other convenient procedure. Such resins, of course, can be treated with oxyalkylating agents, such as ethylene oxide, propylene oxide, glycide, etc., but they may be also converted into valuable derivatives by reaction with other reagents, such as epichlorohydrin or ethylene imine. After reacting with epichlorohydrin, the intermediate product thus obtained can be reacted with a tertiary amine, such as pyridine, to give quaternary ammonium compounds, which are valuable for various purposes, such as stopping or inhibiting the growth of micro-organic organisms.

| Ex. No. | Phenol Used | Amt. | Boleko Nut Fatty Acid | Zinc Acetate | Formaldehyde | HCl (Conc.) | Sulphonate |
|---|---|---|---|---|---|---|---|
| | | Grams | Grams | Grams | Grams | Grams | Grams |
| 2a | Para-secondary amylphenol | 172 | 150 | 15 | 45 | 3.5 | 1.5 |
| 3a | Mixed para-tertiary amylphenol and ortho-tertiary amyl-phenol | 172 | 150 | 15 | 44 | 3.5 | 1.5 |
| 4a | Ortho-tertiary amylphenol | 172 | 150 | 15 | 40 | 3.5 | 1.5 |
| 5a | Para-tertiary hexyl-phenol | 188 | 150 | 20 | 38 | 4.0 | 2.0 |
| 6a | Para-octyl-phenol | 216 | 150 | 25 | 46 | 4.0 | 2.0 |
| 7a | Para-phenyl-phenol | 178 | 150 | 20 | 44 | 4.0 | 2.0 |
| 8a | Para-cyclohexylphenol | 184 | 150 | 20 | 40 | 4.0 | 2.0 |
| 9a | Styrylphenol | 207 | 150 | 25 | 40 | 5.0 | 2.2 |
| 10a | Para-tertiary decylphenol | 245 | 150 | 25 | 40 | 5.0 | 2.2 |
| 11a | Para-tertiary dodecylphenol | 274 | 150 | 28 | 32 | 5.0 | 2.2 |
| 12a | Para-tertiary tetra-decyl-phenol | 315 | 150 | 30 | 50 | 5.5 | 2.3 |
| 13a | Para-tertiary butylphenol | 157 | 150 | 15 | 43 | 3.5 | 1.5 |

PART 2

We have prepared derivatives of the kind described in Part 1, preceding, on a scale varying from a few hundred grams or less in the laboratory, to several pounds on a pilot plant scale. The same applies in the preparation of the oxyalkylated compounds with which this second part of the text is concerned. In preparing a large number of examples we have found it particularly advantageous to use laboratory equipment which permits continuous oxypropylation and oxyethylation. More specific reference will be made to treatment with glycide, subsequently in the text. The oxypropylation step is, of course, the same as the oxyethylation step insofar that two low boiling liquids are handled in each instance. What immediately follows refers to oxyethylation, and it is understood that oxypropylation cna be handled conveniently in exactly the same manner.

The oxyethylation procedure employed in the preparation of derivatives of the preceding intermediates has been uniformly the same, particularly in light of the fact that a continuous operating procedure was employed. In this particular procedure the autoclave was a conventional autoclave, made of stainless steel and having a capacity of approximately one gallon, and a working pressure of 1,000 pounds gauge pressure. The autoclave was equipped with the conventional devices and openings, such as the variable stirrer operating at speeds from 50 R. P. M. to 500 R. P. M., thermometer well and thermocouple for mechanical thermometer; emptying outlet; pressure gauge, manual vent line; charge hole for initial reactants; at least one connection for conducting the incoming alkylene oxide, such as ethylene oxide, to the bottom of the autoclave; along with suitable devices for both cooling and heating the autoclave, such as a cooling jacket, and preferably, coils in addition thereto, with the jacket so arranged that it is suitable for heating with steam or cooling with water, and further equipped with electrical heating devices. Such autoclaves are, of course, in essence small scale replicas of the usual conventional autoclave used in oxyalkylation procedures.

Continuous operation, or substantially continuous operation, is achieved by the use of a separate container to hold the alkylene oxide being employed, particularly ethylene oxide. The container consists essentially of a laboratory bomb having a capacity of about one-half gallon, or somewhat in excess thereof. This bomb was equipped, also, with an inlet for charging and an outlet tube going to the bottom of the container so as to permit discharging of alkylene oxide in the liquid phase to the autoclave. Other conventional equipment consists, of course, of the rupture disc, pressure gauge, sight feed glass, thermometer connection for nitrogen for pressuring bomb, etc. The bomb was placed on a scale during use and the connections between the bomb and the autoclave were flexible stainless hose or tubing, so that continuous weighings could be made without breaking or making any connections. This also applied to the nitrogen line which was used to pressure the bomb reservoir. To the extent that it was required any other usual conventional procedure or addition which provided greater safety was used, of course, such as safety glass, protective screens, etc.

With this particular arrangement practically all oxyethylations become uniform, in that the reaction temperature could be held within a few degrees of any selected point in this particular range. In the early stages where the concentration of catalyst is high, the temperature was generally set for around 150° C., or thereabouts. Subsequently, temperatures up to 170° C. or higher may be required. It will be noted by examination of subsequent examples that this temperature range was satisfactory. In any case, where the reaction goes more slowly, a higher temperature may be used, for instance, 165° C. to 180° C., and if need be, 185° C. to 190° C. Incidentally, oxypropylation takes place more slowly than oxyethylation, as a rule, and for this reason, we have used a temperature of approximately 160° C. to 165° C., as being particularly desirable for initial oxypropylation, and have stayed within the range of 165° C. to 185° C., almost invariably during oxypropylation. The ethylene oxide was forced in by means of nitrogen pressure as rapidly as it was absorbed, as indicated by the pressure gauge on the autoclave. In case the reaction slowed up, the temperature was raised so as to speed up the reaction somewhat by use of extreme heat. If need be, cooling water was employed to control the temperature.

As previously pointed out in the case of oxypropylation, as differentiated from oxyethylation, there was a tendency for the reaction to slow up as the temperature dropped much below the selected point of reaction, for instance, 170° C. In this instance, the technique employed was the same as before, i. e., either cooling water was cut down or steam was employed, or the addition of propylene oxide speeded up, or electric heat used in addition to the steam in order that the reaction proceeded at or near the selected temperatures to be maintained.

Inversely, if the reaction proceeded too fast, regardless of the particular alkylene oxide, the amount of reactant being added, such as ethylene oxide, was cut down or electrical heat was cut off, or steam was reduced, or if need be, cooling water was run through both the jacket and the cooling coil. All these operations, of course, are dependent on the required number of conventional gauges, check valves, etc., and the entire equipment, as has been pointed out, is conventional, and, as far as we are aware, can be furnished by at least two firms who specialize in the manufacutre of this kind of equipment.

Attention is directed to the fact that the use of glycide requires extreme caution. This is particularly true on any scale other than small laboratory or semi-pilot plant operations. Purely from the standpoint of safety in the handling of glycide, attention is directed to the following:

(a) If prepared from glycerol monochlorohydrin, this product should be comparatively pure;

(b) The glycide itself should be as pure as possible, as the effect of impurities is difficult to evaluate;

(c) The glycide should be introduced carefully and precaution should be taken that it reacts as promptly as introduced, i. e., that no excess of glycide is allowed to accumulate;

(d) All necessary precaution should be taken that glycide cannot polymerize per se;

(e) Due to the high boiling point of glycide, one can readily employ a typical separable glass resin pot, as described in the co-pending application of Melvin De Grotte and Bernhard Keiser, Serial No. 8,722, filed February 16, 1948, and offered for sale by numerous laboratory supply houses.

If such arrangement is used to prepare laboratory scale duplications, then care should be taken that the heating mantle can be removed rapidly, so as to allow for cooling; or better still, through an added opening at the top, the glass resin pot or comparable vessel should be equipped with a stainless steel cooling coil, so that the pot can be cooled more rapidly than mere removal of the mantle. If a stainless steel coil is introduced, it means that conventional stirrer of the paddle type is changed into the centrifugal type, which causes the fluid or reactants to mix, due to swirling action in the center of the pot. Still better is the use of a laboratory autoclave of the kind previously described in this part; but in any event, when the initial amount of glycide is added to a suitable reactant, the speed of reaction should be controlled by the usual factors, such as (a) The addition of glycide;
(b) The elimination of external heat; and
(c) Use of a cooling coil so there is no undue rise in temperature.

All the foregoing is merely conventional, but is included, due to the hazard in handling glycide.

As has been pointed out, the intermediates prepared as described in Part 1 are most conveniently handled as solutions in an inert solvent, such as xylene, decalin, mesitylene, diethylether of ethyleneglycol, or the like. If such products are to be used after oxyethylation, for demulsification or similar purposes, the solvent may remain. In some instances it is convenient to add more solvent prior to oxyalkylation, and in other instances, part of the solvent may be removed. We have found it convenient to use a solution of about 70% intermediate and 30% solvent, usually xylene. The products obtained as described in Part 1 undergo oxyalkylation reactions very readily, particularly using the procedure, as previously described.

The oxyalkylation step is illustrated by the following examples.

*Example 1b*

210 grams of the intermediate identified as Example 1a and containing 30% solvent (xylene) were mixed with 4 parts of sodium methylate and placed in a small autoclave of the kind previously described. The autoclave was cooled, 100 grams of ethylene oxide were added, and the temperature was permitted to rise to approximately 150° to 165° C. At this stage the maximum pressure shown was 185 pounds per square inch. At the end of 3 hours, the pressure dropped to substantially zero and the ethylene oxide had reacted completely. The resultant product was a non-viscous, amber-colored liquid, which was water-emulsifiable.

After being cooled a second 100-gram batch of ethylene oxide was added and the process repeated. During the second batch-wise oxyalkylation, the time required was 4 hours, the maximum temperature was 160° C., and the maximum pressure was 165 pounds per square inch. A non-viscous, amber-colored liquid was obtained, which was almost water-dispersible.

After the autoclave had cooled a third 100-gram batch of ethylene oxide was added. The third step of the reaction took place more rapidly than before, i. e., requiring only two hours. The maximum temperature was 170° C., and the maximum pressure was 160 pounds. The final product was a viscous, amber-colored liquid which was completely water-soluble.

The final product contained about 12½% xylene. The ratio of ethylene oxide to intermediate was about two to one.

*Example 2b*

The same procedure was followed as in Example 1b, preceding, in regard to the particular reactants, amounts, etc. In this instance, however, an autoclave was used which permitted continuous introduction of ethylene oxide.

The xylene solution of the intermediate (Example 1a) and a slightly increased amount of catalyst (5 grams) were introduced into the autoclave and sealed in the manner previously described. The temperature was then raised to approximately 185° C., and ethylene oxide was introduced in a steady stream so as to maintain the reaction temperature within the range of 170° to 188° C. The maximum pressure during this period was 100 to 125 pounds per square inch. The ethylene oxide was introduced in slightly over three hours by this particular procedure, as compared with nine hours, using the intermittent procedure (batch-wise) as described in Example 1b, preceding. Additional examples are shown in the following table. These examples were obtained by using the continuous procedure with examples taken at two or more points during the oxyalkylation.

| Ex. No. | Derivative No. | Amt. Taken, Grams (Solvent-Free) | Solvent Present, Grams (Xylene) | Sod. Methylate Added, Grams | ETO Added Grams | Time, Hours | Temp. Max., °C. | Max. Pres., lbs. per sq. inch | Solubility in water |
|---|---|---|---|---|---|---|---|---|---|
| 3b | 6a | 366 | 105 | 8.0 | 105 | 1 | 170 | 105 | Insoluble. |
| 4b | 3b | 471 | 105 | | 98 | 1½ | 175 | 98 | Emulsion. |
| 5b | 4b | 569 | 105 | | 206 | ¾ | 168 | 110 | Almost soluble. |
| 6b | 5b | 875 | 105 | | 210 | 1¾ | 169 | 140 | Soluble. |
| 7b | 8a | 234 | 87 | 7.3 | 99 | ½ | 185 | 165 | Insoluble. |
| 8b | 7b | 333 | 87 | | 103 | ½ | 172 | 130 | Emulsion. |
| 9b | 8b | 436 | 87 | | 156 | ½ | 165 | 145 | Almost soluble. |
| 10b | 9b | 592 | 87 | | 157 | ¼ | 165 | 200 | Soluble. |
| 11b | 10a | 395 | 118 | 8.5 | 97 | 1 | 185 | 130 | Insoluble. |
| 12b | 11b | 492 | 118 | | 102 | 1¼ | 180 | 90 | Do. |
| 13b | 12b | 594 | 118 | | 101 | 1½ | 185 | 125 | Emulsion. |
| 14b | 13b | 695 | 118 | | 98 | 1 | 175 | 130 | Do. |
| 15b | 14b | 793 | 118 | 3.0 | 110 | 1 | 175 | 127 | Almost soluble. |
| 16b | 15b | 903 | 118 | | 112 | ¾ | 170 | 142 | Soluble. |
| 17b | 16b | 1,015 | 118 | | 152 | ¾ | 165 | 180 | Do. |
| 18b | 10b | 1,167 | 118 | | 156 | ½ | 175 | 175 | Very soluble. |
| 19b | 12a | 465 | 130 | 10.0 | 210 | 1 | 160 | 185 | Insoluble. |
| 20b | 19b | 675 | 130 | | 217 | 1¼ | 180 | 175 | Emulsion. |
| 21b | 20b | 892 | 130 | | 204 | ⅛ | 185 | 134 | Almost soluble. |
| 22b | 21b | 1,095 | 130 | | 196 | ⅛ | 150 | 200 | Soluble. |
| 23b | 22b | 1,292 | 130 | 2.0 | 203 | ½ | 160 | 195 | Very soluble. |
| 24b | 11a | 424 | 125 | 9.0 | 205 | ¾ | 180 | 135 | Insoluble. |
| 25b | 24b | 629 | 125 | | 205 | 1 | 170 | 145 | Soluble. |
| 26b | 25b | 834 | 125 | | 211 | 1½ | 155 | 165 | Do. |
| 27b | 26b | 1,045 | 125 | | 150 | 1 | 140 | 150 | Very soluble. |
| 28b | 27b | 1,195 | 125 | 3.0 | 153 | ¾ | 135 | 148 | Do. |
| 29b | 13a | 307 | 98 | 7.5 | 108 | ¾ | 155 | 120 | Insoluble. |
| 30b | 29b | 415 | 98 | | 102 | ½ | 160 | 90 | Do. |
| 31b | 30b | 507 | 98 | | 198 | ⅔ | 178 | 135 | Soluble. |
| 32b | 31b | 715 | 98 | | 243 | ¾ | 185 | 165 | Very soluble. |

Example 3b

Propylene oxide was used instead of ethylene oxide, following the same procedure as in Examples 1b, through 2b, preceding, but with this particular change; the amount of propylene oxide added was reversed roughly in molar proportion, i. e., approximately 13¼ grams of propylene oxide were used to replace each 10 grams of ethylene oxide. Propylene oxide did not produce equivalent water - solubility, even at the ultimate stages, or even when used in a greater amount. For this reason it is our preference to use propylene oxide in combination with either ethylene oxide or glycide, or both.

In one modification the procedure followed was the same as in Examples 1b, through 2b, but with this difference; in the first two stages of oxyalkylation, the amount of ethylene oxide indicated was replaced by 32½% more of propylene oxide. In some instances the time required for oxypropylation was somewhat longer than for oxyethylation, and in some instances, the temperature was slightly higher, 5° C. to 10° C., for example. The former insoluble product after the second stage of oxypropylation was then treated with ethylene oxide in the same manner noted in the previous table. If the product did not happen to be water-soluble, or sufficiently water-soluble, a fourth oxypropylation was employed, using about 25% of the amount of ethylene oxide previously noted. This second addition of ethylene oxide and fourth oxyalkylation invariably produced water-solubility.

Example 4b

The same piece of equipment was used as previously described, i. e., an autoclave, although in the instant experiment involving the use of glycide there was no pressure involved and certain changes were made, as noted subsequently. The autoclave was equipped with a water-cooled condenser which was shut off when used as an autoclave. It was equipped also with a separatory funnel and an equalizing pressure tube, so that liquid, such as glycide, could be fed continuously at a dropwise or a faster rate into the vessel and the rate was controlled by visual examination. For convenience, this piece of equipment is referred to as an autoclave, because it was designed essentially for such use, but it is to be noted that it was not so used when glycide was employed as the alkylene oxide.

There were charged into the autoclave the same reactants (intermediate, solvent, and sodium methylate) as in Example 1b. The autoclave was sealed, swept with nitrogen gas and stirring started immediately and heat applied. The temperature was allowed to rise to 120° C. The glycide employed was comparatively pure. 150 grams of glycide were used initially to replace the 100 grams of ethylene oxide employed in the first stage of Example 1b. This was charged into the upper reservoir vessel which had been previously flushed out with nitrogen and was the equivalent of a separatory funnel. The glycide was started slowly into the reaction mass in a drop-wise stream. The reaction started to take place immediately and the temperature rose approximately 10° to 15°. Cooling water was run through the coils so that the temperature for addition of glycide was controlled within the range roughly of 110° to 130° C. The addition was continuous within the limitations and all the glycide was added in less than two hours. This reaction took place at atmospheric pressure with simply a small stream of nitrogen passing into the autoclave at the very top and passing out through the open condenser so as to avoid any possible entrance of air. Subsequently, two more additions of glycide were made, the first being 150 grams and the second being 100 grams. After the first addition of glycide, there was obviously evidence of water emulsifiability, and after the second addition, the product was somewhat soluble. The third addition of glycide was 75 grams. Although the total amount was somewhat less than the amount of ethylene oxide added in Example 1b, the final product had comparable solubility, and, as a matter of fact, both Examples 1b and 4b seemed to be equally effective as demulsifiers when tested on some emulsions from the Hobbs, New Mexico, oil field.

We have found the same alkaline catalyst satisfactory, but any of the other catalysts, such as sodium methylate, ground caustic soda, ground caustic potash, etc., are equally as good.

Also, we have prepared samples in which the weight of the alkylene oxide used was equal to 10 to 20 times by weight of the initial intermediate.

In addition to ethylene oxide, propylene oxide, glycide or mixtures of the two, or all three of these oxides, one can use also methyl glycide and butylene oxide. Butylene oxide, if employed at all, should be used in combination with ethylene oxide, glycide, or methyl glycide. The most desirable combination is, of course, one in which the oxyalkylated derivative shows marked surface activity, which can be readily detected by an emulsification test, as explained in the text immediately following.

Having obtained a suitable intermediate of the kind described, such intermediate is subjected to treatment with a low molal reactive alpha-beta olefine oxide, so as to render the product distinctly hydrophile in nature, as indicated by the fact that it becomes self-emulsifiable or miscible or soluble in water, or self-dispersible, or has emulsifying properties. The olefine oxides employed are characterized by the fact that they contain not over 4 carbon atoms and are selected from the class consisting of ethylene oxide, propylene oxide, butylene oxide, glycide, and methyl glycide. Glycide may be, of course, considered as a hydroxypropylene oxide and methyl glycide as a hydroxybutylene oxide. In any event, however, all such reactants contain the reactive ethylene oxide ring and may be best considered as derivatives of or substituted ethylene oxides. The solubilizing effect of the oxide is directly proportional to the percentage of oxygen present, or specifically, to the oxygen-carbon ratio.

In ethylene oxide the oxygen-carbon ratio is 1:2. In glycide, it is 2:3; and in methyl glycide 1:2. In such compounds the ratio is very favorable to the production of hydrophile or surface-active properties. However, the ratio in propylene oxide is 1:3, and in butylene oxide 1:4. Obviously, such latter two reactants are satisfactorily employed only where the intermediate composition is such as to make incorporation of the desired property practical. In other cases, they may produce marginally satisfactory derivatives, or even unsatisfactory derivatives. They are usable in conjunction with the three more favorable alkylene oxides in all cases. For instance, after one or several propylene oxide or butylene oxide molecules have been attached to the resin molecule, oxyalkylation may be satisfactorily continued, using the more favorable members of the class, to produce the desired hydrophile product. Used alone, these two reagents may, in some cases, fail to produce sufficiently hydrophile derivatives because of their relatively low oxygen-carbon ratios.

Thus, ethylene oxide is much more effective than propylene oxide, and propylene oxide is more effective than butylene oxide. Hydroxypropylene oxide (glycide) is more effective than propylene oxide. Similarly, hydroxybutylene oxide (methyl glycide) is more effective than butylene oxide. Since ethylene oxide is the cheapest alkylene oxide available and is reactive, its use is definitely advantageous, and especially in light of its high oxygen content. Propylene oxide is less reactive than ethylene oxide, and butylene oxide is definitely less reactive than propylene oxide. On the other hand, glycide may react with almost explosive violence and must be handled with extreme care, as previously noted.

As has been pointed out previously, the oxyalkylation of intermediates of the kind from which the products used in the practice of the present invention are prepared, is advantageously catalyzed by the presence of an alkali. Useful alkaline catalysts include soaps, sodium acetate, sodium hydroxide, sodium methylate, caustic potash, etc. As noted, the amount of alkaline catalyst usually is between 0.2% to 2%. The temperture employed may vary from room temperature to as high as 200° C. The reaction may be conducted with or without pressure, i. e., from zero pressure to approximately 200, or even 300, pounds gauge pressure (pounds per square inch). In a general way, the method employed is substantially the same procedure as used for oxyalkylation of other organic materials having reactive phenolic groups.

It may be necessary to allow for the acidity of a resin in determining the amount of alkaline catalyst to be added in oxyalkylation. For instance, if a non-volatile, strong acid such as sulfuric acid is used to catalyze the resinification or intermediate reaction, presumably after being converted into a sulfonic acid, it may be necessary and is usually advantageous to add an amount of alkali equal stoichiometrically to such acidity, and include added alkali over and above this amount as the alkaline catalyst.

It is advantageous to conduct the oxyethylation of the intermediate in presence of an inert solvent, such as xylene, cymene, decalin, ethylene glycol diethylether, diethyleneglycol diethylether, or the like, although with many resins the oxyalkylation proceeds satisfactorily without a solvent. Since xylene is cheap and may be permitted to be present in the final product used as a demulsifier, it is our preference to use xylene.

Considerable of what is said immediately hereinafter is concerned with the ability to vary the hydrophile properties of the compounds used in the process from minimum hydrophile properties to maximum hydrophile properties. Even more remarkable, and equally difficult to explain, are the versatility and utility of these compounds as one goes from minimum hydrophile property to ultimate maximum hydrophile property. For instance, minimum hydrophile property may be described roughly as the point where two ethyleneoxy radicals, or moderately in excess thereof, are introduced per phenolic hydroxyl. Such minimum hydrophile property or sub-surface-activity or minimum surface-activity means that the product shows at least emulsifying properties or self-dispersion in cold or even in warm distilled water (15° C. to 40° C.) in concentration of 0.5% to 5.0%. These materials are generally more soluble in cold water than warm water, and may even be very insoluble in boiling water. Moderately high temperatures aid in reducing the viscosity of the solute under examination. Sometimes if one continues to shake a hot solution, even though cloudy or containing an insoluble phase, one finds that solution takes place to give a homogeneous phase as the mixture cools. Such self-dispersion tests are conducted in the absence of an insoluble solvent.

When the hydrophile-hydrophobe balance is above the indicated minimum (2 moles of ethylene oxide per phenolic nucleus or the equivalent) but insufficient to give a sol, as described immediately preceding, then, and in that event, hydrophile properties are indicated by the fact that one can produce an emulsion by having present 10% to 50% of an inert solvent such as xylene. All that one need do is to have a xylene solution within the range of 50 to 90 parts by weight of oxyalkylated derivatives and 50 to 10 parts by weight of xylene and mix such solution with one, two or three times its volume of distilled water and shake vigorously so as to obtain an emulsion which may be of the oil-in-water type or the water-in-oil type (usually the former) but, in any event, is due to the hydrophile-hydrophobe balance of the oxyalkylated derivative. We prefer simply to use the xylene-diluted derivatives, which are described elsewhere, for this test rather than evaporate the solvent and employ any more elaborate tests, if the solubility is not sufficient to permit the simple sol test in water previously noted.

If the product is not readily water-soluble, it may be dissolved in ethyl or methyl alcohol, ethylene glycol diethylether, or diethylene glycol diethylether, with a little acetone added, if required, making a rather concentrated solution, for instance, 40% to 50%, and then adding enough of the concentrated alcoholic or equivalent solution to give the previously suggested 0.5% to 5.0% strength solution. If the product is self-dispersing (i. e., if the oxyalkylated product is a liquid or a liquid solution self-emulsifiable), such sol or dispersion is referred to as at least semi-stable in the sense that sols, emulsions, or dispersions prepared are relatively stable, if they remain at least for some period of time, for instance 30 minutes to two hours, before showing any marked separation. Such tests are conducted at room temperature (22° C.). Needless to say, a test can be made in presence of an insoluble solvent such as 5% to 15% of xylene, as noted in previous examples. If such mixture, i. e., containing a water-insoluble solvent, is at least semi-stable, obviously the solvent-free product would be even more so. Surface-activity representing an advanced hydrophile-hydrophobe balance can also be determined by the use of conventional measurements hereinafter described. One outstanding characteristic property indicating surface-activity in a material is the ability to form a permanent foam in dilute aqueous solution, for example, less than 0.5%, when in the higher oxyalkylated stage, and to form an emulsion in the lower and intermediate stages of oxyalkylation.

Allowance must be made for the presence of a solvent in the final product in relation to the hydrophile properties of the final product. The principle involved in the manufacture of the herein contemplated compounds for use as demulsifying agents, is based on the conversion of a hydrophobe or non-hydrophile compound or mixture of compounds into products which are distinctly hydrophile, at least to the extent that they have emulsifying properties or are self-emulsifying; that is, when shaken with water they produce stable or semi-stable suspensions, or, in the presence of a water-insoluble solvent, such as xylene, an emulsion. In demulsification, it is sometimes preferable to use a product having markedly enhanced hydrophile properties over and above the initial stage of self-emulsifiability, although we have found that with products of the type used herein, most efficacious results are obtained with products which do not have hydrophile properties beyond the stage of self-dispersibility.

More highly oxyalkylated products give colloidal solutions or sols which show typical properties comparable to ordinary surface-active agents. Such conventional surface-activity may be measured by determining the surface tension and the interfacial tension against paraffin oil or the like. At the initial and lower stages of oxyalkylation, surface-activity is not suitably determined in this same manner but one may employ an emulsification test. Emulsions come into existence as a rule through the presence of a surface-active emulsifying agent. Some surface-active emulsifying agents such as mahogany soap may produce a water-in-oil emulsion or an oil-in-water emulsion depending upon the ratio of the two phases, degree of agitation, concentration of emulsifying agent, etc.

The same is true in regard to the oxyalkylated resins herein specified, particularly in the lower stage of oxyalkylation, the so-called "sub-surface-active" stage. The surface-active properties are readily demonstrated by producing a xylene-water emulsion. A suitable procedure is as follows: The oxyalkylated resin is dissolved in an equal weight of xylene. Such 50-50 solution is then mixed with 1-3 volumes of water and shaken to produce an emulsion. The amount of xylene is invariably sufficient to reduce even a tacky resinous product to a solution which is readily dispersible. The emulsions so produced are usually xylene-in-water emulsions (oil-in-water type) particularly when the amount of distilled water used is at least slightly in excess of the volume of xylene solution and also if shaken vigorously. At times, particularly in the lowest stage of oxyalkylation, one may obtain a water-in-xylene emulsion (water-in-oil type) which is apt to reverse on more vigorous shaking and further dilution with water.

If in doubt as to this property, comparison with a resin obtained from para-tertiary butylphenol and formaldehyde (ratio 1 part phenol to 1.1 formaldehyde) using an acid catalyst and then followed by oxyalkylation using 2 moles of ethylene oxide for each phenolic hydroxyl, is helpful. Such resin prior to oxyalkylation has a molecular weight indicating about 4½ units per resin molecule. Such resin, when diluted with an equal weight of xylene, will serve to illustrate the above emulsification test.

In a few instances, the resin may not be sufficiently soluble in xylene alone but may require the addition of some ethylene glycol diethylether as described elsewhere. It is understood that such mixture, or any other similar mixture, is considered the equivalent of xylene for the purpose of this test.

In many cases, there is no doubt as to the presence or absence of hydrophile or surface-active characteristics in the products used in accordance with this invention. They dissolve or disperse in water; and such dispersions foam readily. With borderline cases, i. e., those which show only incipient hydrophile or surface-active property (sub-surface-activity) tests for emulsifying properties or self-dispersibility are useful. The fact that a reagent is capable of producing a dispersion in water is proof that it is distinctly hydrophile. In doubtful cases, comparison can be made with the butylphenol-formaldehyde resin analog wherein 2 moles of ethylene oxide have been introduced for each phenolic nucleus.

The presence of xylene or an equivalent water-insoluble solvent may mask the point at which a solvent-free product on mere dilution in a test tube exhibits self-emulsification. For this reason, if it is desirable to determine the approximate point where self-emulsification begins, then it is better to eliminate the xylene or equivalent from a small portion of the reaction mixture and test such portion. In some cases, such xylene-free resultant may show initial or incipient hydrophile properties, whereas in presence of xylene such properties would not be noted. In other cases, the first objective indication of hydrophile properties may be the capacity of the material to emulsify an insoluble solvent such as xylene. It is to be emphasized that hydrophile properties herein referred to are such as those exhibited by incipient self-emulsification or the presence of emulsifying properties and go through the range of homogeneous dispersibility or admixture with water even in presence of added water-insoluble solvent and minor proportions of common electrolytes as occur in oil field brines.

Elsewhere, it is pointed out that an emulsification test may be used to determine ranges of surface-activity and that such emulsification tests employ a xylene solution. Stated another way, it is really immaterial whether a xylene solution produces a sol or whether it merely produces an emulsion.

In light of what has been said previously in regard to the variation of range of hydrophile properties, and also in light of what has been said as to the variation in the effectiveness of various alkylene oxides, and most particularly of all ethylene oxide, to introduce hydrophile character, it becomes obvious that there is a wide variation in the amount of alkylene oxide employed, as long as it is at least 2 moles per phenolic nucleus, for producing products useful for the practice of this invntion. Another variation is the molecular size of the resin intermediate chain, as is well understood.

PART 3

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-solublef orm, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials employed as the demulsifying agent of our process.

The present invention is concerned with treatment of petroleum emulsions by means of certain oxyalkylated resins which are hydrophile or subsurface- or surface-active. Such resins in turn are oxyalkylation-susceptible, water-insoluble, organic solvent-soluble, fusible phenol-aldehyde resins, derived from difunctional phenols having a 2,4,6 hydrocarbon substituent with 4 to 8 carbon atoms. Based on actual large scale application in a large number of oil fields in the United States and certain foreign countries, we believe that this type is one of a generic class of material, either as such or in the form of derivatives, which will ultimately be employed in no less than 50% of all chemical demulsifying agents used throughout the world.

In practicing our process for resolving petroleum emulsions of the water-in-oil type, a treating agent or demulsifying agent of the kind above described is brought into contact with or caused to act upon the emulsion to be treated, in any of the various apparatus now generally used to resolve or break petroleum emulsions with a chemical reagent, the above procedure being used alone or in combination with other demulsifying procedure, such as the electrical dehydration process.

One type of procedure is to accumulate a volume of emulsified oil in a tank and conduct a batch type of demulsification procedure to recover clean oil. In this procedure the emulsion is admixed with the demulsifier, for example by agitating the tank of emulsion and slowly dripping demulsifier into the emulsion. In some cases mixing is achieved by heating the emulsion while dripping in the demulsifier, depending upon the convection currents in the emulsion to produce satisfactory admixture. In a third modification of this type of treatment, a circulating pump withdraws emulsion from, e. g., the bottom of the tank, and re-introduces it into the top of the tank, the demulsifier being added, for example, at the suction side of said circulating pump.

In a second type of treating procedure, the demulsifier is introduced into the well fluids at the well-head or at some point between the well-head and the final oil storage tank, by means of an adjustable proportioning mechanism or proportioning pump. Ordinarily the flow of fluids through the subsequent lines and fittings suffices to produce the desired degree of mixing of demulsifier and emulsion, although in some instances additional mixing devices may be introduced into the flow system. In this general procedure, the system may include various mechanical devices for withdrawing free water, separating entrained water, or accomplishing quiescent settling of the chemicalized emulsion. Heating devices may likewise be incorporated in any of the treating procedures described herein.

A third type of application (down-the-hole) of demulsifier to emulsion is to introduce the demulsifier either periodically or continuously in diluted or undiluted form into the well and to allow it to come to the surface with the well fluids, and then to flow the chemicalized emulsion through any desirable surface equipment, such as employed in the other treating procedures. This particular type of application is decidedly useful when the demulsifier is used in connection with acidification of calcareous oil-bearing strata, especially if suspended in or dissolved in the acid employed for acidification.

In all cases, it will be apparent from the foregoing description, the broad process consists simply in introducing a relatively small proportion of demulsifier into a relatively large proportion of emulsion, admixing the chemical and emulsion either through natural flow or through special apparatus, with or without the application of heat, and allowing the mixture to stand quiescent until the undesirable water content of the emulsion separates and settles from the mass.

The following is a typical installation:

A reservoir to hold the demulsifier of the kind described (diluted or undiluted) is placed at the well-head where the effluent liquids leave the well. This reservoir or container, which may vary from 5 gallons to 50 gallons for convenience, is connected to a proportioning pump which injects the demulsifier drop-wise into the fluids leaving the well. Such chemicalized fluids pass through the flowline into a settling tank. The settling tank consists of a tank of any convenient size, for instance, one which will hold amounts of fluid produced in 4 to 24 hours (500 barrels' to 2000 barrels' capacity), and in which there is a perpendicular conduit from the top of the tank to almost the very bottom so as to permit the incoming fluids to pass from the top of the settling tank to the bottom, so that such incoming fluids do not disturb stratification which takes place during the course of demulsification. The settling tank has two outlets, one being below the water level to drain off the water resulting from demulsification or accompanying the emulsion as free water, the other being an oil outlet at the top to permit the passage of dehydrated oil to a second tank, being a storage tank, which holds pipeline or dehydrated oil. If desired, the conduit or pipe which serves to carry the fluids from the well to the settling tank may include a section of pipe with baffles to serve as a mixer, to insure thorough distribution of the demulsifier throughout the fluids, or a heater for raising the temperature of the fluids to some convenient temperature, for instance, 120° to 160° F., or both heater and mixer.

Demulsification procedure is started by simply setting the pump so as to feed a comparatively large ratio of demulsifier, for instance, 1:5,000. As soon as a complete "break" or satisfactory demulsification is obtained, the pump is regulated until experience shows that the amount of demulsifier being added is just sufficient to produce clean or dehydrated oil. The amount being fed at such stage is usually 1:10,000, 1:15,000, 1:20,000, or the like.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 1b, with 15 parts by weigh of xylene and 10 parts by weight of isopropyl alcohol, an excellent demulsifier is obtained. Selection of the solvent will vary, depending upon the solubility characteristics of the oxyalkylated product, and of course, will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 1b, 20%;

A cyclohexylamine salt of a polypropylated naphthalene monosulfonic acid, 24%;

An ammonium salt of a polypropylated naphthalene monosulfonic acid, 24%;

A sodium salt of oil-soluble mahogany petroleum sulfonic acid, 12%;

A high-boiling aromatic petroleum solvent, 15%;

Isopropyl alcohol, 5%.

The above proportions are all weight percents.

Having thus described our invention, what we claim as new and desire to secure by Letters Patent is:

1. A process for breaking petroleum emulsions of the water-in-oil type, characterized by subjecting the emulsion to the action of a demulsifier including hydrophile synthetic products; said hydrophile synthetic products being oxyalkylation products of: (A) an alpha-beta alkylene oxide having not more than 4 carbon atoms and selected from the class consisting of ethylene oxide, propylene oxide, butylene oxide, glycide and methylglycide; and (B) an oxyalkylation-susceptible, fusible, organic solvent-soluble, water-insoluble phenol-isanic acid-formaldehyde resin; said resin being derived by a reaction involving approximately 2 moles of a difunctional phenol, one mole of isanic acid, and one-fourth to one-half mole of formaldehyde; said resin being formed in the substantial absence of trifunctional phenols; said phenol being of the formula;

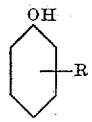

in which R is a hydrocarbon radical having at least 4 and not more than 14 carbon atoms and substituted in the 2,4,6 position; said oxyakylated resin being characterized by the introduction into the resin molecule of a plurality of divalent radicals having the formula $(R_1O)_{n'}$ in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

2. A process for breaking petroleum emulsions of the water-in-oil type, characterized by subjecting the emulsion to the action of a demulsifier including hydrophile synthetic products; said hydrophile synthetic products being oxyethylation products of an oxyethylation-susceptible, fusible, organic solvent-soluble, water-insoluble, phenol-isanic acid-formaldehyde resin; said resin being derived by reaction involving two moles of a difunctional phenol, one mole of isanic acid, and one-fourth to one-half mole of formaldehyde; said resin being formed in the substantial absence of trifunctional phenols; said phenol being of the formula:

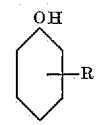

in which R is a hydrocarbon radical having at least 4 and not more than 14 carbon atoms and substituted in the 2,4,6 position; said oxyethylated resin being characterized by the introduction into the resin molecule of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of said oxyalkylated resin in an equal weight of xylene are sufficient to produce an emulsion when said xylene solution is shaken vigorously with one to three volumes of water.

3. The process of claim 2, wherein the phenol is para-tertiary amylphenol.

4. The process of claim 2, wherein the phenol is para-octylphenol.

MELVIN DE GROOTE.
BERNHARD KEISER.

REFERENCES CITED

The following references are of record in the file of this patent:

UNITED STATES PATENTS

| Number | Name | Date |
|---|---|---|
| 2,454,541 | Bock et al. | Nov. 23, 1948 |

OTHER REFERENCES

Hackh's Chemical Dictionary, Third Edition, page 451. Pub. 1944 by the Blakiston Co. of Phila.